Figures 1, 2, 3:
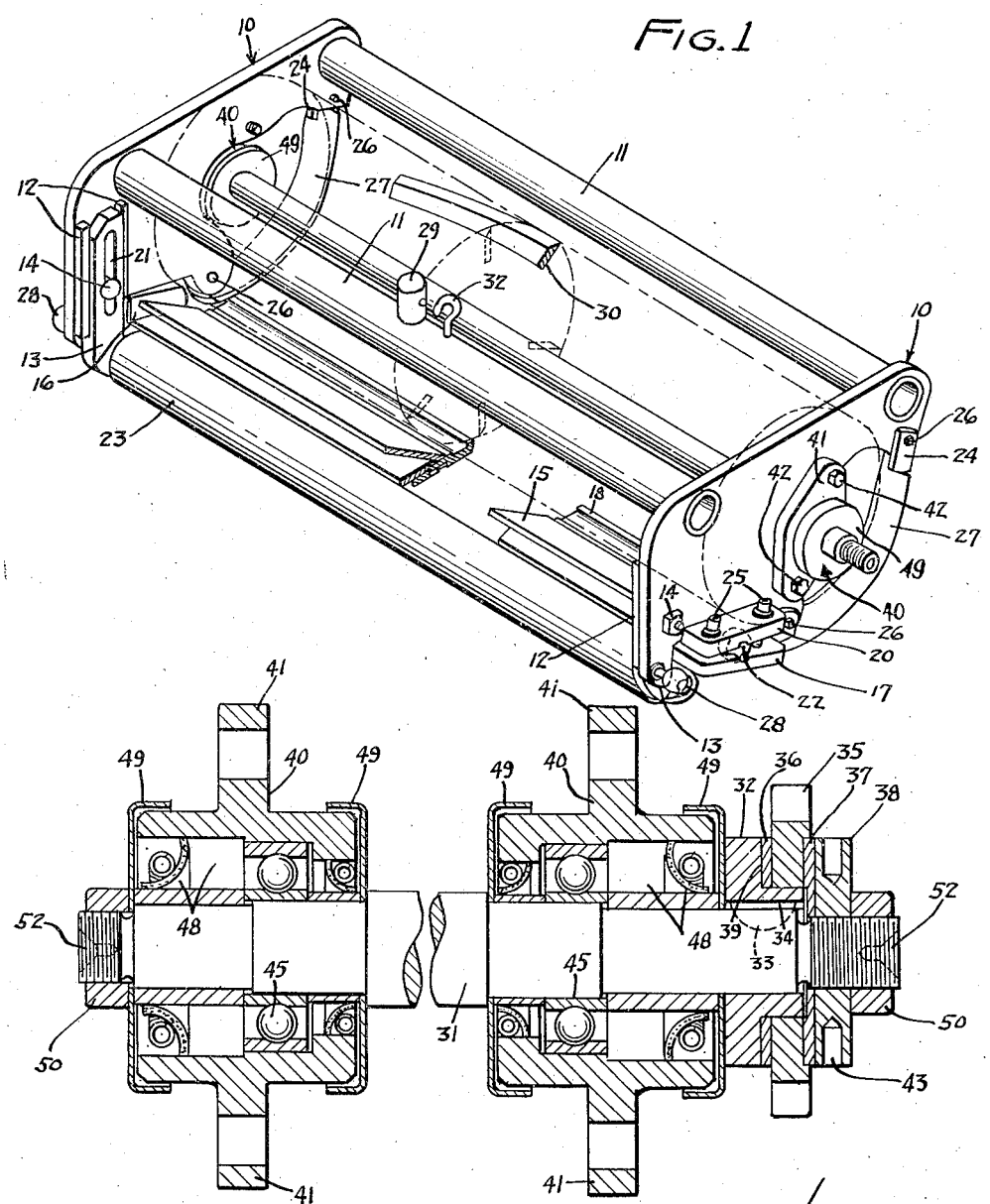

March 27, 1945. R. W. SPEISER 2,372,300
MOWER UNIT
Original Filed Sept. 3, 1940

INVENTOR
RALPH W. SPEISER
By Paul, Paul & Moore
ATTORNEYS

Patented Mar. 27, 1945

2,372,300

UNITED STATES PATENT OFFICE 2,372,300

MOWER UNIT

Ralph W. Speiser, Minneapolis, Minn., assignor to Toro Manufacturing Corporation of Minnesota, Minneapolis, Minn., a corporation of Minnesota Original application September 3, 1940, Serial No. 355,171. Divided and this application February 12, 1942, Serial No. 430,631

10 Claims. (Cl. 56—249)

This invention relates to lawn mowers and particularly to an improved mower unit of the rotary reel type. Such units include a rotary reel having a plurality of spirally disposed knives, the outer limits of which describe a cylindrical path. The knives are mounted on a frame for cooperation with a stationary bedknife, the latter being arranged on the frame parallel with the axis of rotation of the rotary reel and in a position to engage or nearly engage the rotary reel knives. For satisfactory cutting operation, the bedknife must be maintained in accurate adjustment with respect to the rotary reel with which it cooperates, even though there are strains on the mower unit frame, or upon the reel or knives. For satisfactory servicing, the reel of the unit must be capable of ready removal for sharpening, and must be capable of reassembly in accurate cutting relation upon the frame.

It is an object of the invention to provide an improved mower unit of great strength and ruggedness, capable of withstanding shocks in service and capable of resisting warping and twisting stresses even though the unit may be entirely supported from one end or at the middle or from several points.

It is a further object of the invention to provide an improved mower unit which may be fabricated from readily available sheet, tube and bar stock, with a minimum number of especially cast, forged or machined parts.

It is another object of the invention to provide an improved rotary reel mower unit wherein the rotary reel is carried by bearing units, so arranged that the reel may be readily removed from the mower unit for servicing and sharpening and without dismantling the bearings of the reel.

It is another object of the invention to provide an improved rotary reel mower unit wherein the knife bar is of rugged and improved design capable of being fabricated at low cost from readily available stocks and capable when mounted in the completed unit, of contributing to the strength and rigidity of the unit and of maintaining accurate operation of the unit.

Other and further objects are those inherent in the structure herein fully illustrated, described and claimed.

The invention is illustrated by the drawing in which

Figure 1 is an isometric view with some of the parts removed and others broken away showing one of the cutting units of the assembly, and Figures 2 and 3 are fragmentary views in section of the two bearing units of the reel shaft.

Throughout the drawing and specification, the same numerals refer to corresponding parts.

The mowing unit consists of a frame composed of side plates, generally designated 10, which are connected together by two or more intermediate frame members 11, and by the bedknife bar, generally designated 15. The frame members 11 are preferably of steel tube welded to the side plates 10 and the side plates are preferably of sheet steel cut to shape by dies, shears, or by an acetylene cutting torch.

The knife bar 15 is preferably made of steel plate, grooved and bent along the groove so as to close the groove and form a V-shaped bar. The knife bar 15 may, if desired, be an integral rolled steel bar of the shape shown, rather than the folded bar herein illustrated. At each of the ends of the knife bar 15, there is welded a gusset plate 16, to which in turn there is welded an outwardly extending plate 17. Upon the unit side plates 10, there are welded outwardly extending brackets 20, which overlie plates 17 when the knife bar is assembled on the unit. The under side of each bracket 20 and the upper side of each plate 17 is milled with a circular cutter, and a circular disc key 22 is inserted and the whole knife bar assembly 15 is held in place by adjusting screws 25 which pass through brackets 20 and are threaded into plates 17. The axis of pivoting of the knife bar 15 is the center of disc keys 22. The keys 22, in addition serve positively to prevent endwise movement of the knife bar 15 with reference to each side plate 10 and as a result, the knife bar 15 serves not only as a support for the bedknife 18, but also as a frame stiffening member. The mowing units are accordingly very rugged and little subject to weaving.

The reel 30 of the cutting unit, together with the bearings upon which the reel revolves, are detachable as an assembly from the cutting unit frame, this being illustrated in Figures 1, 2 and 3. Each end of the reel shaft 31 projects through a bearing housing 40. The housing 40 has an apertured flange 41 through which cap screws 42 pass for fastening the housings to the unit frame. The housings 40 are bored to receive ball bearing units 45 and oil seals 48. The shaft 31 also carries slinger cups 49 which embrace each side of the housing. The slinger cups serve to exclude tough grass and wire from the oil seals 48, thus enabling them to wear longer and function better.

The entire assembly of slinger cups 49, oil seals 48 and bearings 45 are held assembled in the housings 40 by means of nuts 50 at each end of the shaft, and the exposed ends of the shaft 31 are provided with cone centers 52 so that the reel may be set up accurately in a grinding machine for sharpening, all without dismantling the bearing units.

Upon the inner side of each side plate, there is welded a pair of parallel bars 12 which form a slide to receive the roll supporting brackets 13, the latter in turn being held in place on the side plates by bolts and nuts 14. Each bracket 13 is provided with a vertical slot 21 so as to allow adequate vertical adjustment of the bracket 13 in the groove formed by the spaced bars 12. The brackets 13 carry the usual ground engaging roll 23 of wood or metal, the roll being journaled in suitable sleeve or ball bearings in the brackets for easy turning of the roll.

At the forward end of each of the side plates 10, there is provided a guard, preferably a curved steel rod 24 attached by bolts 26 to the plates 10. The rod 24 is preferably covered with a resilient pad such as a piece of rubber hose 27.

The mower unit is exceptionally rugged and resists impact stress due to stones or sticks coming between the knives of reel 30 and stationary knife 18, and resists, to an exceptional degree, the strains imparted by the supporting structure upon which the unit may be carried. Thus, the unit may be carried by a mounting attached to one of the side plates 10 or by a mounting attached to both side plates 10 and the rear cross frame member 11 (for which the attachment parts 28, 29 and 32 are illustrated). Both modes of mounting are illustrated in my copending application Serial No. 355,171, filed September 3, 1940, now Patent Number 2,299,859. Or the mower unit may be carried by frame members attached centrally to cross frame members 11. This mode of mounting (and the range of utility of the mower unit herein illustrated) are shown in detail in my copending application Serial No. 390,789 filed April 28, 1941, now Patent Number 2,329,952.

The rotation of the cutter reel 30 may be by belt or chain drive as illustrated in my copending applications aforementioned. For the chain drive, there is preferably included a slip clutch arrangement illustrated in Figure 3, having a driven collar 32 keyed to shaft 31 by a Woodruff or other suitable key 33. The collar has a central flange 34 serving to seat and center the drive sprocket 35, the latter being held between friction washers 36 and 37. Washer 37 is held in place by a clutch disc 38, screw threaded upon shaft 31. Clutch disc 38, the surface 39 of collar 32 and the faces of sprocket 35 are ground smooth and parallel. The tightness of the clutch arrangement (and hence the limiting torque it is capable of transmitting) may be adjusted with nicety by rotating disc 38 on the threaded end of shaft 31, after which the adjustment is fixed by tightening nut 50. Ordinarily sprocket 35 drives the shaft 31 without slipping but should the reel 30 become jammed by striking a stone or iron, or the like, the sprocket 35 will slip, thus sparing the driving mechanism and cutter unit from excessive strains. Holes 43 in the edge of disc 38 are provided for rotating the disc by means of a pin or special wrench.

This application is a division of my application Serial No. 355,171 filed September 3, 1940, now Patent Number 2,299,859.

Many obvious variations may be made in the apparatus herein described and illustrated without departing from the spirit or scope of the invention claimed.

I claim as my invention:

1. A rotary reel type mower unit comprising a frame assembly having a pair of spaced side plates each having a bearing housing receiving notch extending inward from the edge of the plate, and transverse cross-frame members joining the side plates with the notches of the side plates extending in the same direction, said side plates and cross-frame members being fixedly joined together to form said frame assembly, a reel and bearing assembly having a rotary reel including a reel-shaft of length sufficiently long to extend at the outer side of each side plate, bearing units for each end of the reel shaft, each unit including a housing having a bearing therein, said bearing units being mounted, one on each end of the reel shaft, with the ends of the reel shaft extending beyond the bearing units, means for retaining the bearing units from axial movement on the reel shaft so as to form a reel and bearing assembly, said reel and bearing assembly being mounted on the frame assembly with the bearing housings positioned in the notches of the side plates, and removable fastening means for holding the bearing housings in assembled condition resting in said notches.

2. A mower unit of the type set forth in claim 1 further characterized in that said notches are in the front lower portions of the side plates when the mower is in normal operating position and each plate has detachably secured thereto a curved guard extending arcuately across the notches forwardly therefrom and slightly outwardly in the radial direction from the rotary path of the reel so as to prevent injury to the ends of the reel blades and prevent long grass from winding on the reel shaft.

3. A rotary reel type mower unit having a frame composed of similarly shaped side plates and transverse cross frame members and a bed knife attached to the plates with the plates in parallel relation and spaced from each other, each of said plates having a bearing housing receiving notch extending inward from the edge of the plate, a rotary reel and bearing assembly composed of a shaft, a rotary reel thereon, and a bearing on each end of the shaft, said bearings being spaced from each other on the shaft so as to fit the spacing of the side plates, each of said bearings being rotatable with reference to the shaft but not substantially movable endwise thereon, each bearing being shaped to fit into the notch in its side plate and provided with means for attachment to said side plate, said rotary reel and bearing assembly being attached to the frame with one of the bearings in each notch and with the rotary reel in cooperative position with respect to said bed knife.

4. A rotary reel mower unit having a frame composed of similarly shaped side plates, each of said plates having a top edge, back edge, and forward edge, frame members extending across the unit from one side plate to the other and attached thereto for stiffly holding the plates in parallel spaced relation with the several edges of the plates in corresponding positions, a bed knife extending from one side plate to the other, and a rotary reel and bearing assembly on the mower having a reel shaft, a rotary reel thereon and bearing assemblies on the ends of the reel shaft, each assembly including a bearing housing having means thereon for attachment to one of the side plates, a bearing within the housing and means for restraining the bearing and housing from axial movement on the shaft, the front edges of the side plates being shaped to fit and hold the bearing housings in a position such that the rotary reel is in cooperative relation with respect to the bed knife, and removable attachment means for attaching the bearing housings to corresponding edges of the side plates for holding the bearing housings and hence the rotary reel and bearing assembly in assembled relationship on the edges of the side plates.

5. A rotary reel mower unit having a frame composed of side plates each having a bottom edge, top edge, back edge and a downwardly and backwardly slanting front edge, tubular cross frame members attached to the side plates for holding them in parallel spaced relationship, the front edge of each side plate being notched inwardly along its front edge to form a place to receive a bearing assembly, said cross frame members being positioned to connect opposite top edges of the side plates, a bed knife mounted on a knife bar, said knife bar being attached to the bottom edges of the side plates to stiffen the frame, and a rotary reel-bearing assembly mounted on the frame, said assembly including a reel shaft having a reel thereon, a bearing in a housing mounted on each end of the shaft and fastened against endwise movement, said housing being shaped to fit the notches of the side plates and provided with flanges for attachment to said side plates and removable fastenings for holding the bearing housings and hence the rotary reel in assembled relation on the side plates.

6. A rotary reel mower unit having a frame comprising a pair of similar stiff steel side plates, steel cross frame members of relatively large diameter extending across the unit from the upper part of one side plate to the upper part of the other side plate and welded thereto for solidly holding the side plates in parallel spaced relationship, a bed knife mounted on a knife bar, said knife bar extending across the unit below the cross frame members and from one side plate to the other, and attached thereto for stiffening the unit frame, said side plates each being formed with a bearing receiving space opening inward from an edge of the side plate, and a rotary reel and bearing assembly comprising a reel shaft having a reel thereon, a bearing unit mounted in rotary relationship on each end of the shaft and affixed thereon against substantial endwise displacement, each bearing unit including a housing shaped to fit the side plate bearing receiving space and having means thereon for attachment to the side plate and a bearing within the housing for journalling the reel shaft therein, said reel and bearing assembly being attached to the frame with each bearing housing fitted into the bearing receiving space of its side plate and fastened thereto.

7. The apparatus of claim 6 further characterized in that the reel shaft extends through the bearing housing, and each bearing housing is fitted with grease and dust seals on each side thereof.

8. A rotary reel type mower unit comprising a frame assembly having a pair of spaced side plates each having a bearing housing receiving notch extending inward from the edge of the plate, and transverse cross-frame members joining the side plates with the notches of the side plates extending in the same direction, said side plates and cross-frame members being fixedly joined together to form said frame assembly, a reel and bearing assembly having a rotary reel including a reel-shaft of length sufficiently long to extend at the outer side of each side plate, bearing units for each end of the reel shaft, each unit including a housing having a bearing therein, said bearing units being mounted, one on each end of the reel shaft, with the ends of the reel shaft extending beyond the bearing units, means for retaining the bearing units from axial movement on the reel shaft so as to form a reel and bearing assembly, flanged cups mounted on the reel shaft so as to rotate with the shaft, the cups being sufficiently large to embrace the ends of bearing housing with the flange overlying the end of the housing to exclude foreign material therefrom, said reel and bearing assembly being mounted on the frame assembly with the bearing housings positioned in the notches of the side plates, and removable fastening means for holding the bearing housings in assembled condition resting in said notches.

9. A mowing unit having side plates, intermediate frame members extending from one side plate to the other for connecting them together, a knife bar at each of the ends of which there is attached a gusset plate to which in turn there is attached an outwardly extending plate, outwardly extending brackets attached to the side plates, said brackets being positioned so as to overlie the outwardly extending plates when the knife bar is assembled on the unit, the under side of each bracket and the upper side of each outwardly extending plate having a milled section, a circular disc key between each outwardly extending plate and bracket, the assembly being held in place by adjusting screw means connecting said outwardly extending plates and brackets, a rotary reel mounted on the side plates and a cooperating bedknife mounted on the knife bar.

10. A mowing unit having side plates, intermediate frame members extending from one side plate to the other for connecting them together, a knife bar at each of the ends of which there is an outwardly extending plate, outwardly extending brackets attached to the side plates, said brackets being positioned so as to overlie the outwardly extending plates when the knife bar is assembled on the unit, the under side of each bracket and the upper side of each outwardly extending plate having a milled section, a circular disc key between each outwardly extending plate and bracket, the assembly being held in place by adjusting screw means connecting said outwardly extending plates and brackets, a rotary reel mounted on the side plates and a cooperating bedknife mounted on the knife bar.

RALPH W. SPEISER.